United States Patent
Heydinger et al.

[11] Patent Number: 6,015,206
[45] Date of Patent: *Jan. 18, 2000

[54] BLEED AVOIDING, COLOR INK JET PRINTING

[75] Inventors: Scott Michael Heydinger; James Knox Howes, III, both of Lexington, Ky.

[73] Assignee: Lexmark International, Inc., Lexington, Ky.

[ * ] Notice: This patent issued on a continued prosecution application filed under 37 CFR 1.53(d), and is subject to the twenty year patent term provisions of 35 U.S.C. 154(a)(2).

[21] Appl. No.: 08/560,765

[22] Filed: Nov. 21, 1995

[51] Int. Cl.[7] ........................................................ B41J 2/21
[52] U.S. Cl. ................................ 347/43; 347/5; 395/109
[58] Field of Search ...................... 347/43, 41, 5, 347/9, 12, 15; 395/109; 358/532, 518

[56] References Cited

U.S. PATENT DOCUMENTS

| | | | |
|---|---|---|---|
| 4,614,967 | 9/1986 | Sayanagi | 358/75 |
| 4,682,216 | 7/1987 | Sasaki et al. | 358/79 |
| 4,748,453 | 5/1988 | Lin et al. | 347/41 |
| 5,012,257 | 4/1991 | Lowe et al. . | |
| 5,057,852 | 10/1991 | Formica et al. | 347/43 |
| 5,168,552 | 12/1992 | Vaughn et al. | 315/109 |
| 5,220,342 | 6/1993 | Moriyama . | |
| 5,771,054 | 6/1998 | Dudek et al. | 347/102 |

FOREIGN PATENT DOCUMENTS

| | | | |
|---|---|---|---|
| 0 595 650 A2 | 5/1994 | European Pat. Off. | B41J 2/21 |
| 596 373 A2 | 5/1994 | European Pat. Off. | B41J 2/21 |

*Primary Examiner*—N. Le
*Assistant Examiner*—Shin-Wen Hsieh
*Attorney, Agent, or Firm*—John A. Brady

[57] ABSTRACT

In an ink jet printer, bleed between the boundaries between color and black are avoided by printing process black and black ink in an alternating pattern for the first two dots. Logic (62) determines the boundary from a bit map and issues the control signals for alternating lines (66, 68). Best results are experienced when the process black is printed before the black ink as the vehicle of the colored inks apparently supports penetration of the black ink.

20 Claims, 2 Drawing Sheets

BLEED AVOIDING, COLOR INK JET PRINTING

TECHNICAL FIELD

The invention relates to ink jet printing with colored ink and black inks. In printing black inks contiguous to colors, bleed is typically noticeable, and this invention is directed to negating such noticeable bleed.

BACKGROUND OF THE INVENTION

Jet ink is typically liquid which tends to follow paper fibers when printed on paper. When printing dots are one three hundredth of an inch (1/300 inch) or larger, such spreading is noticeable when black ink is printed beside typical colors of the visual spectrum. U.S. Pat. No. 5,168,552 to Vaughn et al and European Patent Application 595 650 A2 published May 4, 1994, of Moriyama et al recognizes this disadvantage and attempts to cure it by printing three color black (often termed process black) on the boundary between color and black. This invention employs a pattern of black ink and process black at such borders. European Patent Application 596 373 A2 published May 11, 1994, of Sato et al discloses in its FIG. 12A–FIG. 12D a pattern as employed by this invention, but each pixels is much larger than those of a pattern used to control bleed in accordance with this invention.

U.S. Pat. No. 5,220,342 to Moriyama teaches alternating black ink and process black to speed printing, not with reference to a border of black and color in the image to be printed. U.S. Pat. No. 4,682,216 to Sasaki et al employs alternating process black and black ink when black intensity is to be a certain level. U.S. Pat. No. 5,057,852 to Formica et al employs overlapping dots of process black and black dye to improve and smooth the edges of black images. U.S. Pat. No. 5,012,257 to Lowe et al employs a pattern of printing on diagonals to minimizing bleed across color boundaries.

DISCLOSURE OF THE INVENTION

In accordance with this invention, bleed effects at image boundaries between color and black are avoided in resolution of at least about 300×300 dots per inch (dpi) by printing the black with black ink on diagonals and process ink on diagonals at least for the first two dots from the boundary. Any bleed becomes substantially unnoticeable to the ordinary observer. Best results are experienced when the process black is printed prior to the liquid ink black, the vehicle of the process black apparently supporting penetration of the black ink.

BRIEF DESCRIPTION OF THE DRAWING

The details of this invention will be described in connection with the accompanying drawing, in which FIG. 1 schematically illustrates a printer for practicing this invention.

BEST MODE FOR CARRYING OUT THE INVENTION

Figure 1:
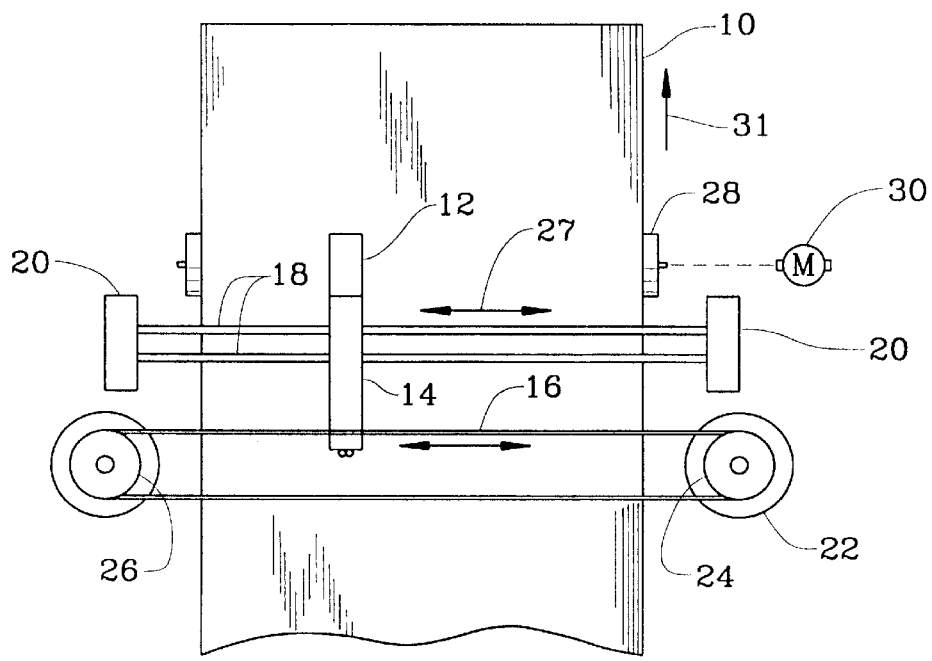

FIG. 1 schematically illustrates a conventional ink jet printer for printing graphically or alphanumerically on a record medium 10. The printer includes a print head 12 carried by a support 14 attached to a drive belt 16. The support 14 slides on two guide rails 18 mounted at each side of paper 10 in fixed supports 20. A stepper motor 22 drives a first pulley 24. Drive belt 16 encircles pulleys 24 and an idler pulley 26 so that as the motor 22 is selectively energized in first one direction and then the other, the belt pulls support 14 along rails 18 so that the print head 12 is moved back and forth across the front of paper 10 along a horizontal axis as indicated by arrow 27.

The print medium (typically paper) is supported a fixed distance from the printhead nozzles by various means. This is frequently done with a rotating platen but other means are present in the industry. In this embodiment a platen 28 or a roller system, is driven by a stepping motor 30 to advance the paper in the direction indicated by arrow 31 orthogonal to the direction of print head movement.

Figure 2:
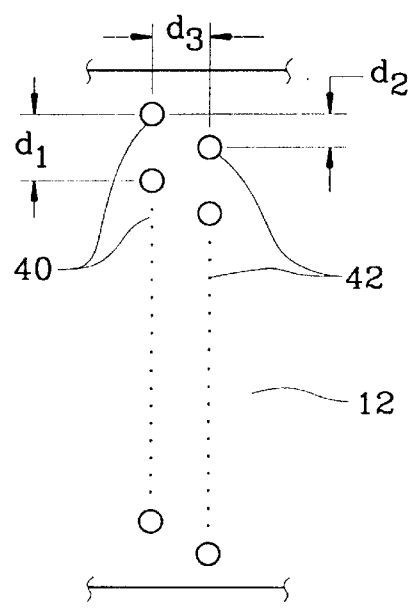
FIG. 2 illustrates nozzles in a print head employed with this invention.

FIG. 2 is illustrative of the nozzles 40 and 42 of a print head for ink jet printing. Nozzles 40 are in one column and nozzles 42 are in a second column spaced laterally a distance $d_3$ and staggered vertically a distance $d_2$ which is one half vertical the distance $d_1$ between the nozzles in each column of nozzles 40 and nozzles 42. Each column includes a number, such as 28 nozzles 40 or 42 with a spacing $d_1$ between centers of adjacent nozzles of 1/150 inch. The nozzles 40 of one column are offset vertically with respect to the nozzles 42 of the other column by a distance $d_2$ of 1/300 inch, thus providing a vertical dot resolution of 300 dots per inch when print head 12 moves across the paper. The printer is a full spectrum color printer, and print head 12 actually has four sets of two columns as shown illustratively in FIG. 2, spaced from one another in a predetermined pattern.

The actual implementation of ink jet and color printing are not significant to the practice of this invention and therefore will not be described in detail.

The printer is under control of a microprocessor, which functions to control the printer in all necessary manner and drive the nozzles 40 and 42 and other nozzles of the print head. One set of nozzles prints black ink, being liquid with a black dye or pigment. One set of nozzles prints magenta ink. being liquid with a magenta dye or pigment. One set of nozzles prints cyan ink, being liquid with a cyan dye or pigment. And one set of nozzles prints yellow ink, being liquid with a yellow dye or pigment.

Figure 3:
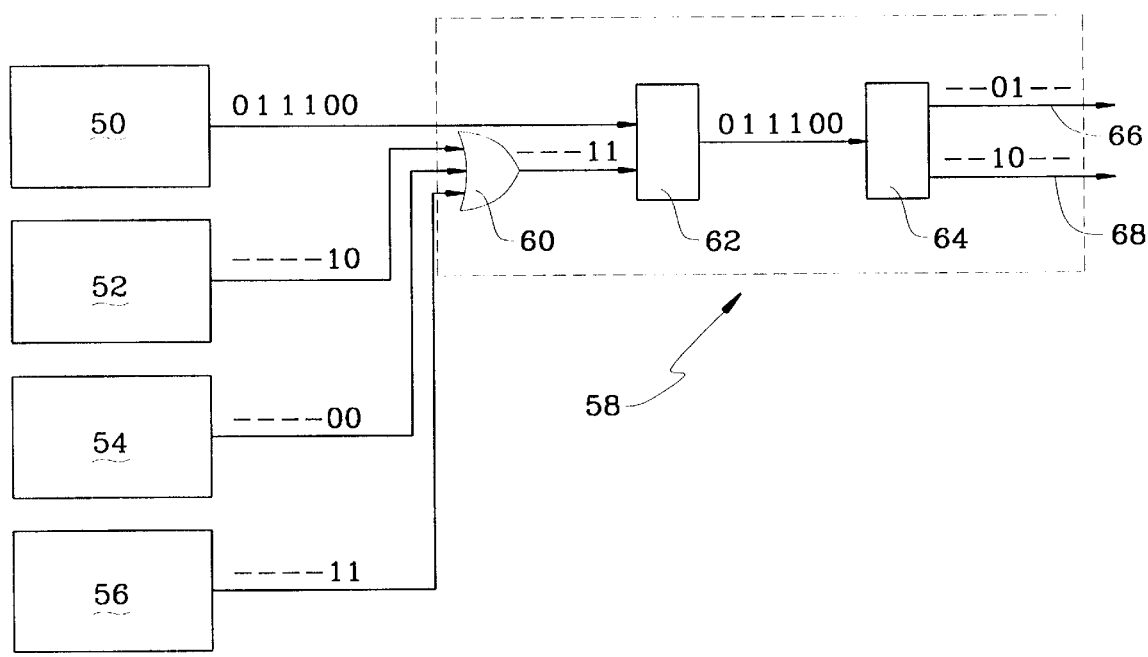
FIG. 3 illustrates control logic to determine the boundary between color and black in the bit map of an image to be printed and to print the alternating process black and ink black of this invention.

FIG. 3 illustrates control logic by which a boundary between black and color in the image to be printed is found and the alternating printing is made. Bit maps of the image to be printed are created as is entirely standard. The black bit map is stored in memory 50, the magenta bit map is stored in memory 52, the cyan bit map is stored in memory 54, and the yellow bit map is stored in memory 56. Each memory location may be in at least two states, which are commonly termed 1 and zero, as is conventional. A 1 is stored to direct the printing of that color in the 1/300 inch pel at the pel location corresponding to the relative position of the bit in the memory. The same relative positions in the four memories 50, 52, 54 and 56 specify printing at the same pel location in the image being printed and the contiguous information is directed to the contiguous pel position in the image being printed.

FIG. 3 shows six units of data output from memories 50, 52, 54 and 56. These are 1's and 0's from each memory from the same line of pels in the image being printed and from the same position in the line. This is repeated throughout the entire bit map for the images. However, only the six units of data shown are needed to describe the controls of this invention, and the processing of bit maps and the machine logic and control by a logic circuits or microprocessor 58 is well established.

Implementation will be first described by an illustrative, simplified, one dimensional implementation of FIG. 3. Logic 62 receives black pel data directly from black memory 50. Logic 58 combines the bit maps from the three color bit maps 52, 54 and 56 in OR logic 60, so that the output of OR 60 will be a 1 when any of the color bit maps 52, 54 and 56 stores a 1. Thus, the first bit from OR logic 60 is a 1 because the yellow memory 56 issues a 1. The second bit from OR logic 60 is a 1 because magenta memory 52 issues a 1 and also because yellow memory 56 issues a 1.

Boundary logic 62 receives the memory data for black and the OR logic 60 data and detects a transition from a 1 from OR logic and a 0 from black memory 50, to the next bit from black memory 50 being a 1. Accordingly, with respect to the illustrative data of FIG. 3, the third black bit is that boundary black. Boundary logic 62 therefore begins to issue 1 bits so long as black bits are received from memory 50. These one bits are applied to ODD/EVEN logic 64.

ODD/EVEN logic 64 transitions with each line of data being examined. The first line in the image bit map is considered odd and the designation of lines then alternates from odd to even with each line. When the line is odd, ODD/EVEN logic 64 issues black signals on output line 66, which controls the printing to print process black pels at the first pel position in the line and issues the next signal on output line 68, which controls the printing to print black in pels, with the next signal being on line 66 with this alternation continuing through the line. When the next line in the image map is printed, that line is even, and ODD/EVEN logic 64 issues its first black signal on output line 68, which controls the printing to print black ink pels at the first pel position and issues the next black signal on output line 66, which controls the printing to print process black pels, with the next signal being on line 68, with this alternation continuing through the line. Actual signal for black printing are issued and printed from lines 66 and 68 when logic 62 issues a 1 bit.

Figure 4:
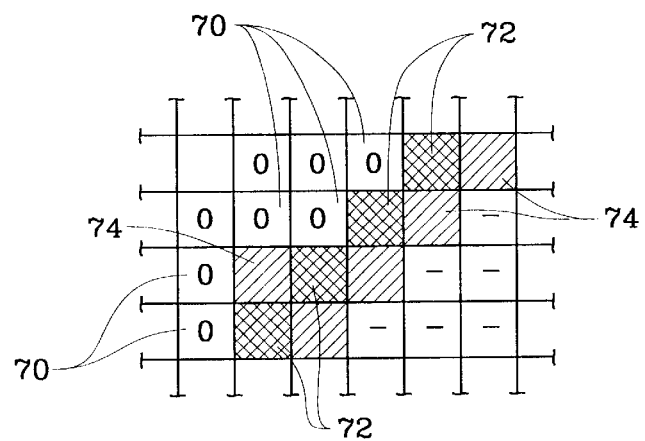
FIG. 4 illustrates the alternating printing of this invention.

The foregoing defines horizontal boundaries and the even and odd lines for printing. Vertical boundaries need also be found, which may be by similar implementation to that of FIG. 3 in which the bit map is examined vertically by OR logic in the manner shown horizontally in FIG. 3. Final printing is illustrated in FIG. 4, which illustrates a mapping representation of an actual printing by an ink jet printer of this invention on a substrate. Pels with circles illustrate colors printed as distinguished from process black or black ink. Color pels 70 are at a boundary with black, which would produce noticeable bleed of black into pels 70 absent this invention. Double cross hatch pels 72 illustrate printing with black ink, and single cross hatched pels 74 pels illustrate printing with process black ink. Thus, the black ink pels 72 are printed on diagonals with one another, as are the process black ink pels 74. In each horizontal line of printing, each of the pels 72 alternate with pels 74, and the pels 72 and 74 alternate with adjoining lines immediately above and below. After two pels horizontally and vertically from the boundary with color, bleed is not a factor and so the manner of printing is immaterial with respect to this invention, as is illustrated by dashes.

As a practical implementation a microprocessor is employed and the bit map is examined in 4 pel by 4 pel contiguous large segments (each having 16 pels). Where color is found in any large segment, that segment is treated as area at which solid black ink is not to be printed in that large segment nor in a contiguous large segment (the large segment is the center of a regular square of nine of the large segments). The black memory is then addressed with the black content from that memory entered in the color memories to create process black in the alternating pattern by even and odd lines as described with respect to FIG. 3. Where process black is created, that data is removed from the black memory. Accordingly, the alternating black ink with process black may begin away from an actual boundary, but it will occur at any broader as shown in FIG. 4.

Best results are experienced when the process black dots of inks colored with dyes are printed before the liquid ink black dots of ink of black dye as the vehicle of the process black inks apparently supports penetration of the liquid black ink. Colored inks are generally formulated for good penetration, whereas black inks are not since penetration detracts from the intensity of the black appearance. Of course, certain inks may be incompatible and therefore not respond well to this invention.

In accordance with this invention with 300×300 dpi resolution printing on ordinary paper with conventional liquid ink jet ink, bleed at the boundary is not apparent where without this invention it would be quite apparent.

Variations will be apparent and can be anticipated. In particular the manner of control of the printer may take a wide variety of forms and the disclosure here is clearly only illustrative.

What is claimed is:

1. A method of forming an image on a substrate, comprising the steps of:

a) receiving a representation of an image defined according to a plurality of locations in the image, selected ones of the locations in the image each being one of a plurality of colors, the plurality of colors being black and at least one color other than black;

b) providing a substrate having a plurality of locations thereon, the plurality of locations on the substrate generally corresponding to the plurality of locations in the image, and the plurality of locations on the substrate being generally aligned in columns and rows;

c) identifying color boundary locations, the color boundary locations being the locations on the substrate corresponding to the locations in the image which are one of the at least one color other than black and contiguous to one of the locations in the image which is the color black;

d) identifying a black boundary for each of the color boundary locations, each of the black boundaries including a column boundary and a row boundary, i) each of the column boundaries including at least two contiguous ones of the locations on the substrate, each of said at least two contiguous ones of the locations on the substrate included in the respective column boundary corresponding to one of the locations in the image which is the color black and being aligned in one of the columns with the respective color boundary location, and one of said at least two contiguous locations on the substrate included in the respective column boundary being contiguous to the respective color boundary location; and ii) each of the row boundaries including at least two contiguous ones of the locations on the substrate, each of said at least two contiguous ones of the locations on the substrate included in the respective row boundary corresponding to one of the locations in the image which is the color black and being aligned in one of the rows with the respective color boundary location, and one of said at least two contiguous locations on the substrate included in the respective row boundary being contiguous to the respective color boundary location;

e) delivering at least one ink to each of the locations on the substrate corresponding to one of the locations in the image which is one of the plurality of colors, the respective at least one ink being capable of generally forming the color of the respective corresponding location in the image on the substrate, the ink being delivered to the locations on the substrate corresponding to the black boundaries including ink having the color black and a plurality of inks that combine to form process black on the substrate, and being delivered in an alternating pattern, wherein the locations on the substrate corresponding to the black boundaries to which the black ink is delivered are diagonally arranged with respect to the columns and rows in black ink diagonal arrangements, and wherein the locations on the substrate corresponding to the black boundaries to which said plurality of inks that combine to form process black are delivered are diagonally arranged with respect to the columns and rows in process black diagonal arrangements, the black ink and process black diagonal arrangements across adjacent columns and rows being mutually exclusive; and f) generally receiving the respective at least one ink on each of the locations on the substrate corresponding to one of the locations in the image which is one of the plurality of colors, wherein said locations on the substrate which have generally received one of the respective at least one ink combine to form the image on the substrate.

2. The method according to claim 1, wherein the plurality of inks that combine to form process black are received on one of the locations on the substrate corresponding to the black boundaries prior to the black ink being received on a respective contiguous one of the locations on the substrate corresponding to the black boundaries.

3. The method according to claim 1, wherein each of the column boundaries includes only two contiguous ones of the locations on the substrate, each of said two contiguous ones of the locations on the substrate included in the respective column boundary corresponding to one of the locations in the image which is the color black and being aligned in one of the columns with the respective color boundary location, and one of said two contiguous locations on the substrate included in the respective column boundary being contiguous to the respective color boundary location.

4. The method according to claim 1, wherein each of the row boundaries includes only two contiguous ones of the locations on the substrate, each of said two contiguous ones of the locations on the substrate included in the respective row boundary corresponding to one of the locations in the image which is the color black and being aligned in one of the rows with the respective color boundary location, and one of said two contiguous locations on the substrate included in the respective row boundary being contiguous to the respective color boundary location.

5. The method according to claim 1, wherein said step of generally receiving the respective at least one ink on each of the locations on the substrate corresponding to one of the locations in the image which is one of the plurality of colors comprises receiving a dot of the respective color on each of said locations on the substrate, each dot having a diameter of not greater than about $1/300$ inch.

6. The method according to claim 1, wherein said step of receiving a representation of the image comprises receiving a bit map of the image, each of the locations on the substrate corresponding to a relative position in the bit map, wherein said step of identifying a black boundary for each of the color boundary locations comprises determining a boundary between a color portion and a black portion in the bit map.

7. The method according to claim 1, wherein the representation of the image comprises a plurality of segments, each of the segments corresponding to a four location by four location group of the locations on the substrate, further comprising the step of examining each of the segments for corresponding ones of the locations on the substrate which correspond to one of the locations in the image which is one of the at least one color other than black, wherein said steps of identifying color boundary locations and identifying a black boundary location for each of the color boundary locations are performed for the locations on the substrate corresponding to one of the segments only if the respective segment or one of the segments contiguous to the respective segment corresponds to one of the locations on the substrate which corresponds to one of the locations in the image which is one of the at least one color other than black.

8. The method according to claim 7, further comprising, for the locations on the substrate corresponding to the segments which do not correspond to one of the locations on the substrate which corresponds to one of the locations in the image which is one of the at least one color other than black and which are not contiguous to one of the segments which corresponds to one of the locations on the substrate which corresponds to one of the locations in the image which is one of the at least one color other than black, delivering only ink having the color black to the locations on the substrate corresponding to the locations in the image which are the color black.

9. The method according to claim 1, wherein said step of providing a substrate comprises providing paper.

10. An imaging apparatus for forming an image on a substrate, comprising:

a) memory capable of receiving a representation of an image defined according to a plurality of locations in the image, selected ones of the locations in the image each being one of a plurality of colors, the plurality of colors being black and at least one color other than black;

b) a substrate having a plurality of locations thereon, the plurality of locations on the substrate generally corresponding to the plurality of locations in the image, and the plurality of locations on the substrate being generally aligned in columns and rows;

c) control logic capable of communicating with the memory, identifying color boundary locations, the color boundary locations being the locations on the substrate corresponding to the locations in the image which are one of the at least one color other than black and contiguous to one of the locations in the image which is the color black, and identifying a black boundary for each of the color boundary locations, each of the black boundaries including a column boundary and a row boundary, i) each of the column boundaries including at least two contiguous ones of the locations on the substrate, each of said at least two contiguous ones of the locations on the substrate included in the respective column boundary corresponding to one of the locations in the image which is the color black and being aligned in one of the columns with the respective color boundary location, one of said at least two contiguous ones of the locations on the substrate included in the respective column boundary being contiguous to the respective color boundary location; and ii) each of the row boundaries including at least two contiguous ones of the locations on the substrate, each of said at least two contiguous ones of the locations on the substrate included in the respective row boundary corresponding to one of the locations in the image which is the color black and being aligned in one of the rows with the respective color boundary location, one of said at least two contiguous ones of the locations on the substrate included in the respective row boundary being contiguous to the respective color boundary location; and d) a printhead capable of communicating with the control logic and delivering at least one ink to each of the locations on the substrate corresponding to one of the locations in the image which is one of the plurality of colors, the respective at least one ink being capable of generally forming the color of the respective corresponding location in the image on the substrate, the ink being delivered to the locations on the substrate corresponding to the black boundaries including ink having the color black and a plurality of inks that combine to form process black on the substrate, and being delivered in an alternating pattern, wherein the locations on the substrate corresponding to the black boundaries to which the black ink is delivered are diagonally arranged with respect to the columns and rows in black ink diagonal arrangements, wherein the locations on the substrate corresponding to the black boundaries to which said plurality of inks that combine to form process black are delivered are diagonally arranged with respect to the columns and rows in process black diagonal arrangements, the black ink and process black diagonal arrangements across adjacent columns and rows being mutually exclusive, and wherein each of the locations on the substrate corresponding to one of the locations in the image which is one of the plurality of colors generally receives the respective at least one ink and combine to form the image on the substrate.

11. The imaging apparatus according to claim 10, wherein the printhead is capable of delivering the plurality of inks that combine to form process black to one of the locations on the substrate corresponding to the black boundaries prior to delivering the black ink to a respective contiguous one of the locations on the substrate corresponding to the black boundaries.

12. The imaging apparatus according to claim 10, wherein each of the column boundaries includes only two contiguous ones of the locations on the substrate, each of said two contiguous ones of the locations on the substrate included in the respective column boundary corresponding to one of the locations in the image which is the color black and being aligned in one of the columns with the respective color boundary location, and one of said two contiguous locations on the substrate included in the respective column boundary being contiguous to the respective color boundary location.

13. The imaging apparatus according to claim 10, wherein each of the row boundaries includes only two contiguous ones of the locations on the substrate, each of said two contiguous ones of the locations on the substrate included in the respective row boundary corresponding to one of the locations in the image which is the color black and being aligned in one of the rows with the respective color boundary location, and one of said at least two contiguous locations on the substrate included in the respective row boundary being contiguous to the respective color boundary location.

14. The imaging apparatus according to claim 10, wherein the printhead is capable of delivering the respective at least one ink to each of the locations on the substrate corresponding to one of the locations in the image which is one of the plurality of colors so that a dot of the respective color is formed at each of said locations, each dot having a diameter of not greater than about 1/300 inch.

15. The imaging apparatus according to claim 10, wherein the representation of the image comprises a bit map, each of the locations on the substrate corresponding to a relative position in the bit map, and wherein the control logic is capable of determining a boundary between a color portion and a black portion in the bit map.

16. The imaging apparatus according to claim 10, wherein the representation of the image comprises a plurality of segments, each of the segments corresponding to a four location by four location group of the locations on the substrate, wherein the control logic is capable of examining each of the segments for corresponding ones of the locations on the substrate which correspond to one of the locations in the image which is one of the at least one color other than black, and wherein the control logic identifies color boundary locations and a black boundary location for each of the color boundary locations among the locations on the substrate corresponding to one of the segments only if the respective segment or one of the segments contiguous to the respective segment corresponds to one of the locations on the substrate which corresponds to one of the locations in the image which is one of the at least one color other than black.

17. The imaging apparatus according to claim 16, wherein, for the locations on the substrate corresponding to the segments which do not correspond to one of the locations on the substrate which corresponds to one of the locations in the image which is one of the at least one color other than black and which are not contiguous to one of the segments which corresponds to one of the locations on the substrate which corresponds to one of the locations in the image which is one of the at least one color other than black, the printhead delivers only ink having the color black to the locations on the substrate corresponding to the locations in the image which are the color black.

18. The imaging apparatus according to claim 10, wherein the imaging apparatus comprises a full spectrum color printer.

19. The imaging apparatus according to claim 10, wherein the control logic comprises a microprocessor.

20. An imaging apparatus capable of forming an image on a substrate, comprising:

a) means for receiving a representation of an image defined according to a plurality of locations in the image, selected ones of the locations in the image each being one of a plurality of colors, the plurality of colors being black and at least one color other than black;

b) means for providing a substrate having a plurality of locations thereon, the plurality of locations on the substrate generally corresponding to the plurality of locations in the image, and the plurality of locations on the substrate being generally aligned in columns and rows;

c) means for identifying color boundary locations, the color boundary locations being the locations on the substrate corresponding to the locations in the image which are one of the at least one color other than black and contiguous to one of the locations in the image which is the color black;

d) means for identifying a black boundary for each of the color boundary locations, each of the black boundaries including a column boundary and a row boundary, i) each of the column boundaries including at least two contiguous ones of the locations on the substrate, each of said at least two contiguous ones of the locations on the substrate included in the respective column boundary corresponding to one of the locations in the image which is the color black and being aligned in one of the columns with the respective color boundary location, and one of said at least two contiguous locations on the substrate included in the respective column boundary being contiguous to the respective color boundary location; and ii) each of the row boundaries including at least two contiguous ones of the locations on the substrate, each of said at least two contiguous ones of the locations on the substrate included in the respective row boundary corresponding to one of the locations in the image which is the color black and being aligned in one of the rows with the respective color boundary location, and one of said at least two contiguous locations on the substrate included in the respective row boundary being contiguous to the respective color boundary location;

e) means for delivering at least one ink to each of the locations on the substrate corresponding to one of the locations in the image which is one of the plurality of colors, the respective at least one ink being capable of generally forming the color of the respective corresponding location in the image on the substrate, the ink being delivered to the locations on the substrate corresponding to the black boundaries including ink having the color black and a plurality of inks that combine to form process black on the substrate, and being delivered in an alternating pattern, wherein the locations on the substrate corresponding to the black boundaries to which the black ink is delivered are diagonally arranged with respect to the columns and rows in black ink diagonal arrangements, and wherein the locations on the substrate corresponding to the black boundaries to which said plurality of inks that combine to form process black are delivered are diagonally arranged with respect to the columns and rows in process black diagonal arrangements, the black ink and process black diagonal arrangements across adjacent columns and rows being mutually exclusive; and f) means for generally receiving the respective at least one ink on each of the locations on the substrate corresponding to one of the locations in the image which is one of the plurality of colors, wherein said locations on the substrate which have generally received one of the respective at least one ink combine to form the image on the substrate.

* * * * *